(12) United States Patent
Lee (10) Patent No.: US 9,720,653 B2
(45) Date of Patent: Aug. 1, 2017

(54) SYSTEM AND METHOD OF PROVIDING IN-APP SERVICE

(75) Inventor: Sang-Bum Lee, Goyang-si (KR)

(73) Assignee: KT Corporation, Seongnam (KR)

( * ) Notice: Subject to any disclaimer, the term of this patent is extended or adjusted under 35 U.S.C. 154(b) by 466 days.

(21) Appl. No.: 13/483,888

(22) Filed: May 30, 2012

(65) Prior Publication Data

US 2012/0311527 A1   Dec. 6, 2012

(30) Foreign Application Priority Data

May 31, 2011   (KR) .................. 10-2011-0052174

(51) Int. Cl.
G06F 9/44       (2006.01)
G06F 17/30      (2006.01)

(52) U.S. Cl.
CPC .......... *G06F 8/30* (2013.01); *G06F 17/30902* (2013.01)

(58) Field of Classification Search
CPC ............... G06F 8/30; G06F 17/30867; G06F 17/30902; H04L 67/306
See application file for complete search history.

(56) References Cited

U.S. PATENT DOCUMENTS

| | | | | |
|---|---|---|---|---|
| 5,842,020 A | * | 11/1998 | Faustini ..................... | 717/111 |
| 5,966,533 A | * | 10/1999 | Moody ...................... | 717/100 |
| 5,973,696 A | * | 10/1999 | Agranat et al. ............ | 715/760 |
| 5,983,227 A | * | 11/1999 | Nazem et al. | |
| 6,122,661 A | * | 9/2000 | Stedman et al. .............. | 709/217 |
| 7,089,295 B2 | * | 8/2006 | Christfort et al. ............ | 709/219 |
| 7,788,321 B2 | * | 8/2010 | Korovkin et al. ............ | 709/203 |
| 8,375,362 B1 | * | 2/2013 | Brette et al. .................. | 717/121 |
| 8,418,131 B2 | * | 4/2013 | Emmelmann ................ | 717/111 |
| 8,621,423 B2 | * | 12/2013 | Knight ..................... | G06F 8/71 |
| | | | | 717/106 |
| 2002/0080200 A1 | * | 6/2002 | Wong et al. .................. | 345/969 |
| 2002/0144233 A1 | * | 10/2002 | Chong et al. ................ | 717/105 |
| 2003/0025728 A1 | * | 2/2003 | Ebbo et al. .................. | 345/744 |
| 2003/0182626 A1 | * | 9/2003 | Davidov et al. ............. | 715/513 |
| 2004/0015714 A1 | * | 1/2004 | Abraham ......... | G06F 17/30867 |
| | | | | 726/4 |
| 2006/0271997 A1 | * | 11/2006 | Jacoby et al. ................ | 725/135 |

(Continued)

FOREIGN PATENT DOCUMENTS

JP   2002259283   9/2002
JP   2011081728   4/2011

(Continued)

*Primary Examiner* — Van Nguyen
*Assistant Examiner* — Jacob Dascomb
(74) *Attorney, Agent, or Firm* — Sughrue Mion, PLLC (57) ABSTRACT

In order for an in-app service providing system comprised of an in-app service server and a content server to provide a customized service to a user, when the in-app service server receives user information from a user terminal of the user, it checks whether or not the received user information has been previously stored. When the user information has been stored, user log information corresponding to the user information is received from the content server, and the in-app service server selects content to be provided to the user based on the user information and the user log information. When the content server generates a template including content, the in-app service server provides the template to the user terminal, thus providing a user-customized service.

15 Claims, 6 Drawing Sheets

(56) References Cited

U.S. PATENT DOCUMENTS

2008/0092107 A1* 4/2008 McWilliam et al. ......... 717/101
2008/0244424 A1* 10/2008 Fukuda et al. ................ 715/763
2011/0196940 A1* 8/2011 Martinez et al. ............. 709/217

FOREIGN PATENT DOCUMENTS

| KR | 1020060126011 A | 12/2006 |
| KR | 1020070070323 A | 7/2007 |
| KR | 10-2009-0000104 A | 1/2009 |
| KR | 1020110017796 A | 2/2011 |

* cited by examiner

SYSTEM AND METHOD OF PROVIDING IN-APP SERVICE

CROSS-REFERENCE TO RELATED APPLICATION

This application claims priority to and the benefit of Korean Patent Application No. 10-2011-0052174 filed in the Korean Intellectual Property Office on May 31, 2011, the entire contents of which are incorporated herein by reference.

BACKGROUND OF THE INVENTION (a) Field of the Invention

The present invention relates to a system and method of providing an in-app service.

(b) Description of the Related Art

In general, when a content provider or a manger managing content (or a content manager) provides content to a user, the content provider or the content manager provides a service through a wired/wireless terminal on the Internet one-sidedly. In this case, since the content provider or the content manager processes and provides stored content to the user, he cannot provide a customized service to a user.

Meanwhile, smart phones which have been currently actively developed and launched provide various applications. As for the applications, an application provider that develops and provides applications determines contents to be included in applications and provide the same to the user. Thus, although there are various applications, there is a limitation in contents a user may use through applications.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method of providing an in-app service having advantages of providing a service distributed by a particular content provider to a plurality of unspecific applications.

An exemplary embodiment of the present invention provides an in-app service providing system including: an in-app service server interworking with a developer terminal or a user terminal, generating a source code with respect to a first template including content to be provided to a user based on application information input from the developer terminal, generating a second template including content for providing a customized service to the user based on information input from the user terminal, and providing the same to the user terminal; and a content server providing content information to be included in the first template or the second template to the in-app service server when an application is executed or is requested by the in-app service server, and storing and managing content substance which is included in the customized service and which is to be provided to the in-app service server.

The in-app service server may include: a developer providing unit interworking with the developer terminal to receive content to be included in the first template, generating a source code for the first template, and providing the same to the developer terminal; a user providing unit interworking with the user terminal to provide the second template to the user terminal; and a template URL/URI storage unit interworking with the developer providing unit and the user providing unit, generating a source code including a URL/URI with respect to selected content based on category information input from a developer terminal and terminal information and providing the same to the developer providing unit, when the source code with respect to the first template is requested by the developer providing unit, and generating a source code including a URL/URI with respect to selected content based on user information and user log information and transferring the same to the user providing unit, when the source code with respect to the second template is requested by the user providing unit.

The content server may include: a template generation unit previously generating a template based on user interface information, terminal information, and category information stored in the in-app service server or generating a template based on user log information when the user log information is collected, and adding content in an input template based on a URL/URI link of the template; a template storage unit storing the template generated by the template generation unit; and a template URL/URI storage unit receiving URL/URI information of a template accessed by the user terminal from the in-app service server and storing the same, and outputting a URL/URI link of the template for providing content previously generated according to the stored URL/URI information to the user terminal.

Another embodiment of the present invention provides a method for providing a customized service to a user by an in-app service providing system comprised of an in-app service server and a content server, including:

receiving, by the in-app service server, user information from a user terminal of the user; checking whether or not the received user information has been previously stored; receiving user log information corresponding to the user information from the content server, when the user information has been stored; selecting, by the in-app service server, content to be provided to the user based on the user information and the user log information; generating, by the content server, a template including the content selected by the in-app service server, and transferring the generated template to the in-app service server; and providing, by the in-app service server, the template to the user terminal.

According to embodiments of the present invention, the content provider can implement templates in various forms desired by a provider and add the same in an in-app, and the user may receive his preferred service through the in-app service without having to terminate an application.

Also, an in-app service can be implemented in the form of a component and inserted into a plurality of unspecified applications, whereby a user-customized service can be provided in any environments.

In addition, since various advertisement services, besides content, can be mounted, a business can be provided through an application.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In the present disclosure, a terminal may refer to a mobile station (MS), a mobile terminal (MT), a subscriber station (SS), a portable subscriber station (PSS), a user equipment (UE), an access terminal (AT), or the like, and may include the entirety or a portion of functions of an MT, an SS, a PSS, a UE, and the like.

An in-app service providing apparatus method according to embodiments of the present invention will be described with reference to the accompanying drawings. To begin with, in-app refers to an application providing a common service in a format in which a component is inserted in a plurality of unspecified applications. Here, an application may be a Web application executed in a Web upon accessing a uniform resource locator (URL) of a Web page, or a native application downloaded to a terminal and executed in to the terminal itself through a uniform resource identifier (URI).

Figure 1:
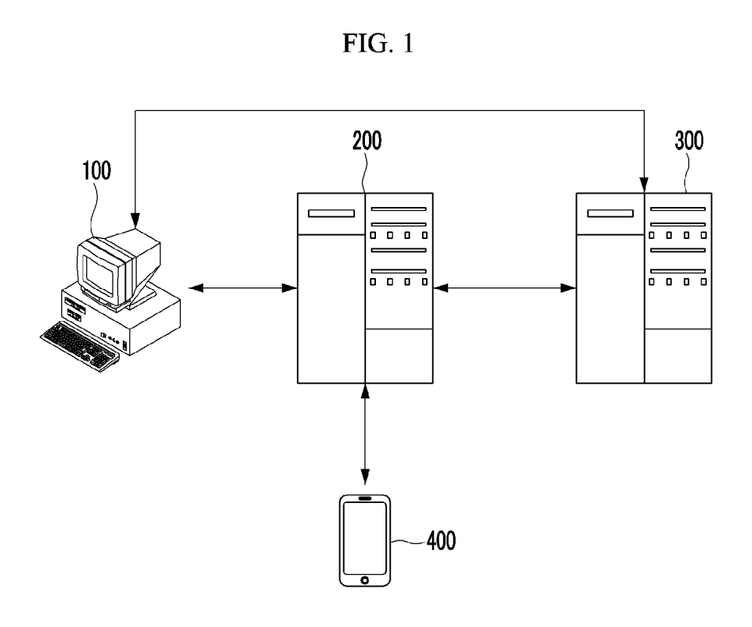
FIG. 1 is a view showing an in-app service providing environment according to an embodiment of the present invention.

FIG. 1 is a view showing an in-app service providing environment according to an embodiment of the present invention.

As illustrated in FIG. 1, in order to provide a user-customized in-app service initiated by a content provider, an in-app service server 200 and a content server 300 interwork. The in-app service server 200 interworks with a developer terminal 100 which develops an application, i.e., an in-app, and a user terminal 400 who uses a service.

The in-app service server 200 generates a source code and a developer-customized template (referred to as a 'first template', hereinafter) with respect to a service to be provided to a user based on application information input by a content developer. The in-app service server 200 generates a service for providing a user-customized service based on information input from a user terminal and adds corresponding content in a template (referred to as a 'second template', hereinafter), and provides the same to the user.

Namely, when in-app information is received from the developer terminal 100, in order to generate a source code with respect to the in-app, the in-app service server 200 requests service information (which also called 'content information') to be included in a template activated according to an execution of the in-app from the content server 300 and receives the requested service information, and generates a source code obtained by processing received information into customized information and provides the generated source code to the developer terminal 100.

When the user terminal 400 requests a service, if there is user to preference, i.e., if there is user log information, the in-app service server 200 provides a customized service according to the preference. However, if there is no user log information, the in-app service server 200 provides a pre-set service. In order to provide the service, the content provider may package the source code configured in a Web language in advance and distribute the same, or implement a source code in the same format as that of a software development kit (SDK) and distribute the same, so that a component can be inserted into various applications.

When the user executes the in-app through the user terminal 400, the content server 300 stores and manages content substance to be provided to the user as an in-app service.

Structures of the in-app service server 200 and the content server 300 will be described with reference to FIGS. 2 and 3.

Figure 2:
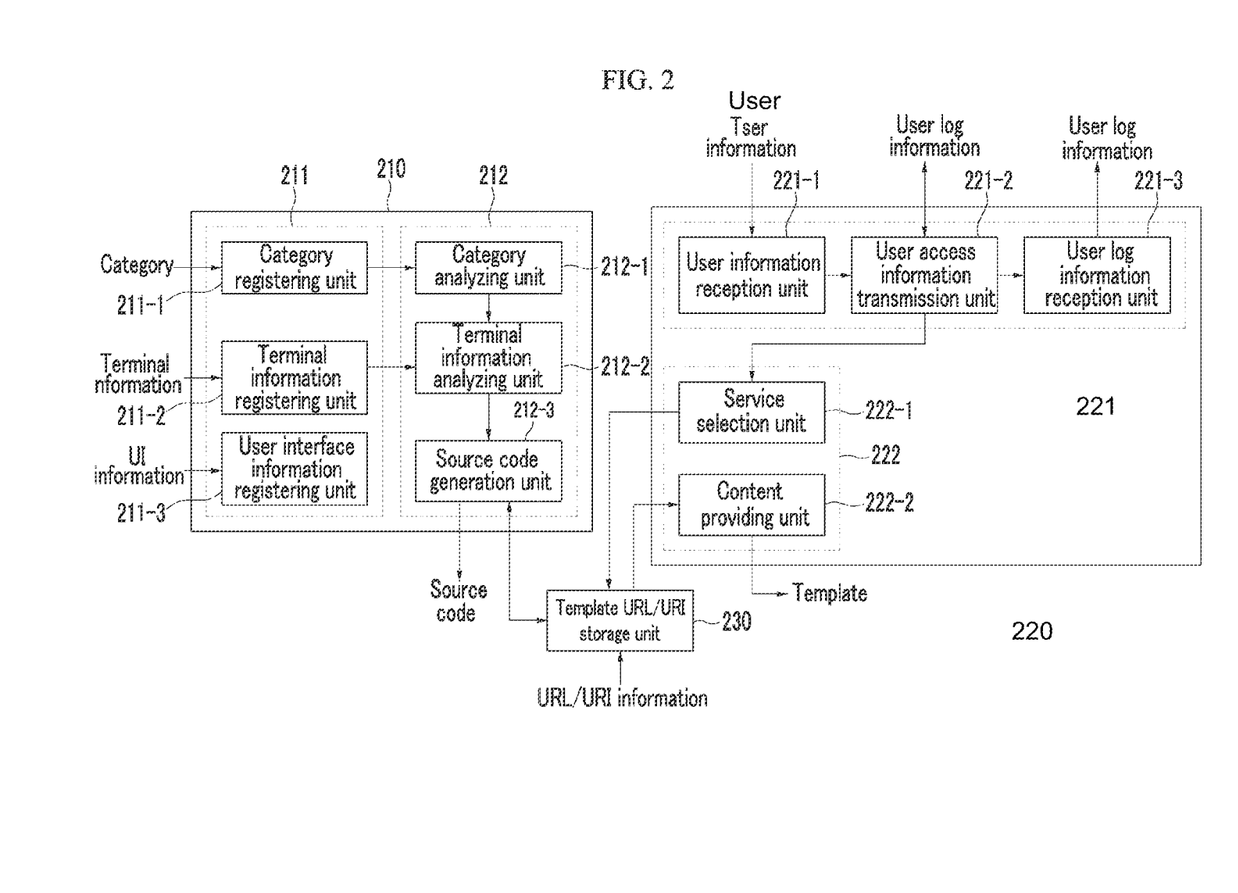
FIG. 2 is a view showing the structure of an in-app service server according to an embodiment of the present invention.
Figure 3:
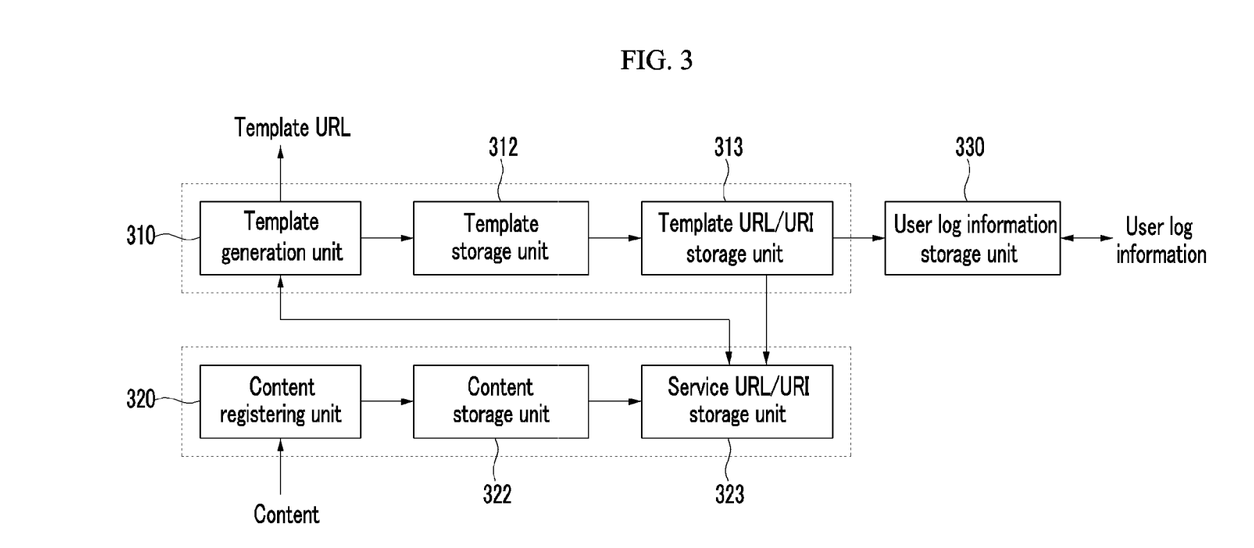
FIG. 3 is a view showing the structure of a content server according to an embodiment of the present invention.

FIG. 2 is a view showing the structure of the in-app service server according to an embodiment of the present invention, and FIG. 3 is a view showing the structure of the content server according to an embodiment of the present invention.

First, as shown in FIG. 2, the in-app service server 200 includes a developer providing unit 210 which interworks with the developer terminal 100 to generate a source code of a template for providing a service, a user providing unit 220 which interworks with the user terminal 400 to generate a user-customized content, and a template URL/URI storage unit 230.

The developer providing unit 210 includes an application information registering unit 211 storing in-app related information and an in-app code generation unit 212 generating a source code to provide an in-app service. The user providing unit 220 includes an information reception unit 221 receiving information regarding a user and an information providing unit 222 providing content.

The application information registering unit 211 registering in-app information transmitted from the developer terminal 100 includes a category registering unit 211-1, a terminal information registering unit 211-2, and a user interface information storage unit 211-3, and the in-app code generation unit 212 generating a source code based on information registered to the application information registering unit 211 and providing the generated source code to the developer terminal 100 includes a category analyzing unit 212-1, a terminal information analyzing unit 212-2, and a source code generation unit 212-3.

The information reception unit 221 receiving information transmitted from the user terminal 400 or transmitted from the content server 300 includes a user information reception unit 221-1, a user log information reception unit 221-3, and a user access information transmission unit 221-2. The information providing unit 222 providing application content to the user terminal 400 based on the information received by the information reception unit 221 includes a service selection unit 222-1 and a content providing unit 222-2.

First, the category registering unit 211-1 registers category information of content input from the developer terminal 100. Here, the category information refers to types of services (content categories such as women, childcare, travel, and the like) desired to be provided to users by the content provider. In an embodiment of the present invention, the content provider providing content will be referred to as a developer, but the present invention is not necessarily limited thereto.

The terminal information registering unit 211-2 stores terminal information of a terminal in which an in-app input from the developer terminal 100 is to be mounted. Here, the terminal information includes information such as types of operating systems (OSs) (e.g., android, iPhone, blackberry, and the like) by which an application is driven.

The user interface information storage unit 211-3 stores user interface (UI) information such as a layout, or the like, of a template input from the developer terminal 100. Namely, the user interface information storage unit 211-3 stores user interface information (template size, color, position, content component position, and the like) regarding a template activated when an in-app is executed.

The category analyzing unit 212-1 receives the category information stored in the category registering unit 211-1 and analyzes the category information input from the developer terminal 100 to check what type of category it is. The category analyzing unit 212-1 previously set representative content with respect to the analyzed category. Namely, when it is assumed that the category is 'childcare', content that can be representatively provided, among various contents that can be provided with respect to childcare, is previously set. In this case, the representative content may be set to be different according to a system environment, and a detailed description of a setting method thereof in an embodiment of the present invention will be omitted.

The terminal information analyzing unit 212-2 receives the terminal information from the terminal information registering unit 211-2 and receives the analyzed category information from the category analyzing unit 212-1, and uses them in analyzing information regarding the terminal in which a corresponding in-app is to be inserted. And then, the terminal information analyzing unit 212-2 transfers the analyzed terminal information along with the category information to the source code generation unit 212-3.

This is because an implementation method of a component for driving an inserted in-app varies according to a type of an OS of a terminal, so a template provided to a user varies according to execution of an in-app. Thus, the terminal information analyzing unit 212-2 receives and analyzes the terminal information, and transfers the analyzed terminal information and the analyzed category information to the source code generation unit 212-3.

The source code generation unit 212-3 receives the category information and the terminal information from the terminal information analyzing unit 212-2, and generates a first source code based on the received information. Here, the source code is a code indicating a position for accessing a URL/URI having content, which is divided into a UI part and a URL/URI part as shown in Table 1 below. Here, the first source code is generated such that the URL/URI part is not inserted therein.

TABLE 1

| | |
|---|---|
| `<scrip type = "text/javascript"><!-`<br>`web_component_client = "pub+8938603765401545`<br>`/*300X250, This was written 10.9.9 */`<br>`web_component_slot = "2759398204";`<br>`web_component_width = 300;`<br>`web_component_height = 250;`<br>`//--?`<br>`</script>` | UI |
| `<script type = "text/javascript"`<br>`src=http://webcomponent.kr.com/webcomponent/show_component.js>` | URL |

Thus, since the UI part is automatically generated by the source code generation unit 212-3 based on the terminal information and the UI information, the source code generation unit 212-3 requests a URL/URI to be inserted into the URL/URI part for providing substance with respect to content from the template URL/URI storage unit 230. Here, the source code generation unit 212-3 transmits the content information previously selected based on the category information analyzed by the category analyzing unit 212-1 and the first source code together, to request inserting of the URL/URI including the corresponding content information into the first source code. Here, the content information makes a service to be provided to a user.

When a second source code in which the URL/URI is inserted is received from the template URL/URI storage unit 230, it is transferred to the developer terminal 100. The thusly generated second source code provides a URL/URI accessing previously selected content based on the size, color, and category information of a UI frame of a template activated by executing an in-app by a first user through the user terminal 400, to the user. Table 1 above shows examples of source codes of a Web component, but the present invention is not necessarily limited thereto.

Meanwhile, when the user accesses to use a service by driving an in-app by using the user terminal 400, the user information reception unit 221-1 of the information reception unit 221 collects user information. Here, the user to information includes identification information of the user terminal, a user name, information regarding a service access time, and the like.

With respect to a user who has continuously used the in-app service, the service log information reception unit 21-3 receives user log information such as a user preferred service type, a time duration in which the user usually uses the service, and the like, from the content server 300. The user log information includes preferred service information, a service usage time, the number of times of using the service, and the like, but the present invention is not necessarily limited thereto. Here, although the user log information has been stored in the content server 300, if information greater than a pre-set threshold value is not stored therein so a user preference cannot be recognized, it may happen that user log information cannot be received from the content server 300.

The user access information transmission unit 221-2 transfers user information to the content server 300 such that the user information can be stored as user log information. And, only identification information of a terminal among user information may be temporarily stored during a pre-set period, and thereafter, when the same user accesses, it may be determined whether or not the user is a user who has already accessed, and if the user is determined to have already accessed, the user access information transmission unit 221-2 requests user log information from the content server 300. This is to recognize the presence or absence of user log information in advance by checking whether or not information corresponding to collected user information has been previously input.

The service selection unit 221-1 receives the user log information from the user log information reception unit 221-3, and when the user terminal 400 executes an in-app based on the received user log information, the service selection unit 221-1 selects a content type to be included in a template so as to be provided to the user, as a service. Here, the content to be provided to the user may be classified into content with user log information and content without log information.

Namely, when the user is a user who has first accessed the service, or when user log information has not been stored by a pre-set limit value, the content set by the developer terminal 100 is set to be placed on the template and provided to the user. However, if the user has accessed the service by more than the pre-set limit value so user log information has been sufficiently collected, the service selection unit 221-1 preferentially selects content, which is commonly used by the user, to be included in a template.

The service selection unit 221-1 transfers information regarding the selected content type to the template URL/URI storage unit 230, and here, information such as a content name, a category, or the like, may be transferred. Here, the user log information is received from the user log information reception unit 221-3 according to a pre-set period or according to a request from the user access information transmission unit 221-2.

When the content providing unit 222-2 receives the template including the content URL/URI selectively requested by the service selection unit 222-1 from the template URL/URI storage unit 230, the content providing unit 222-2 provides the received template to the user terminal 400. Here, the template refers to a screen image provided to the user when an in -app is activated as a state of a component of the user terminal 400 is changed. Various templates may be generated according to UI information and positions of various contents disposed on the template.

The template URL/URI storage unit 230 interworks with the source code generation unit 212-3, the service selection unit 222-1, the content providing unit 222-2, and the content server 300. When the source code generation unit 212-3 requests a source code, the template URL/URI storage unit 230 generates a second source code including a URL/URI of previously selected content based on the category information and terminal information, and transfers the generated second source code to the source code generation unit 212-3. When the service selection unit 222-1 requests a service URL/URI along with user log information, the template URL/URI storage unit 230 provides a URL/URI of a template generated to be user-customized type based on the previously stored template URL/URI or user log information to the content providing unit 222-2, so as to be provided to the user terminal 400.

Meanwhile, as shown in FIG. 3, the content server 300 includes a template selection unit 310 selecting an in-app template, a service selection unit 320 selecting an in-app service and providing the selected in-app service to the in-app service server 200, and a user log information storage unit 330. The template selection unit 310 includes a template generation unit 311, a template storage unit 312, and a template URL/URI storage unit 313. The service selection unit 320 includes a content registering unit 321, a content storage unit 322, and a service URL/URI storage unit 323.

The content registering unit 321 receives content to be provided to users from the content provider, i.e., the developer terminal 100, and registers the received content. When the content is registered, a content name, a content type, a content provider name, and the like, are included and registered. Here, the content has a form of any one of a native application (native app0 or a Web application (Web app). The native app and the Web app are already known, so a detailed description thereof in an embodiment of the present invention will be omitted.

The content storage unit 322 receives content information of the content registered by the content registering unit 321 and stores the same.

The service URL/URI storage unit 323 stores the URL/URI of the content stored by the content storage unit 322, and when a request for the URL/URI is generated, the service URL/URI storage unit 323 transfers the URL/URI to the template generation unit 311. The URL/URI in this case refers to a URL/URI to be inserted into a source code as shown in Table 1, and it is a URL/URI with respect to the content.

The template generation unit 311 previously generates a template based on the UI information, the terminal information, the category information, and the like, stored in the in-app service server 200, and here, a first generated template is generated as a developer-customized template. If user log information is collected, a user-customized template is generated based on the user log information.

The generated template is transferred to and stored in the template storage unit 312, or a URL/URI of the template is provided to the user terminal 400 to allow the user to be provided with a template including various contents or including contents according to a user preference. Namely, when the user first uses the in-app service, some types of templates are implemented in advance and provided, and thereafter, types of services used by the user are analyzed to generate user-customized templates.

The template storage unit 312 stores the template generated by the template generation unit 311.

When the user clicks a component by using the user terminal 400 to execute an in-app and access a particular template, the template URL/URI storage unit 313 receives URL/URI information of the particular template from the in-app service server 200 and stores the received URL/URI information. And, the template URL/URI storage unit 313 provides a URL/URI link of the template to the service URL/URI storage unit 323 so that the content previously generated according to the stored URL/URI information can be provided to the user or user-customized content can be provided.

When the user uses content put on a template selected through the user terminal 400, the user log information storage unit 330 receives content information used by the user, information regarding a time at which the user has accessed the content through the template, and the like, from the user access information transmission unit 221-2, and stores the same. When the user log information reception unit 221-3 requests the user log information, the user log information storage unit 330 transfers the stored information so that the service selection unit 222-1 can select content desired by the user.

Here, the user log information storage unit 330 determines whether or to not the user log information equal to or greater than the pre-set threshold value has been stored. If the log information equal to or greater than the pre-set threshold value has been stored, the user log information storage unit 330 transfers the corresponding user log information to the user log information reception unit 221-3. However, if the log information equal to or greater than the pre-set threshold value has not been stored, the user log information storage unit 330 does not transfer the user log information.

A method of providing a source code and a method of providing a service in an in-app service providing environment in which a user-customized service can be provided as described above will now be described with reference to FIGS. 4 and 5.

Figure 4:
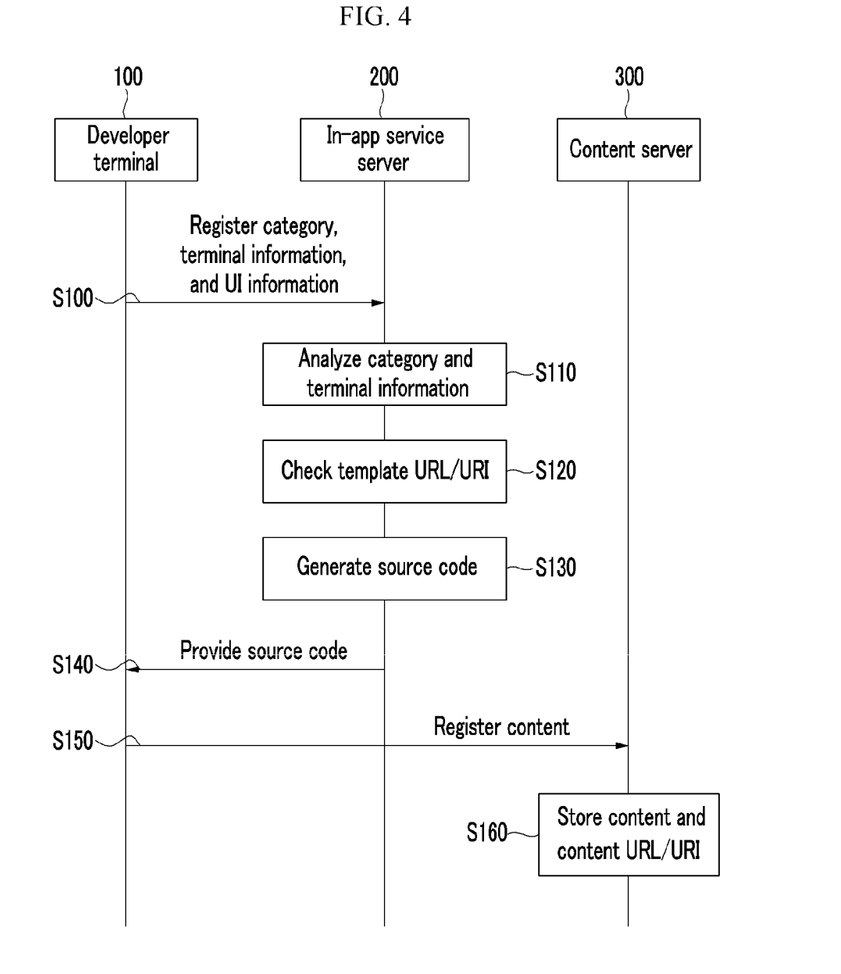
FIG. 4 is a flow chart illustrating the process of a method for providing a source code according to an embodiment of the present invention.
Figure 5:
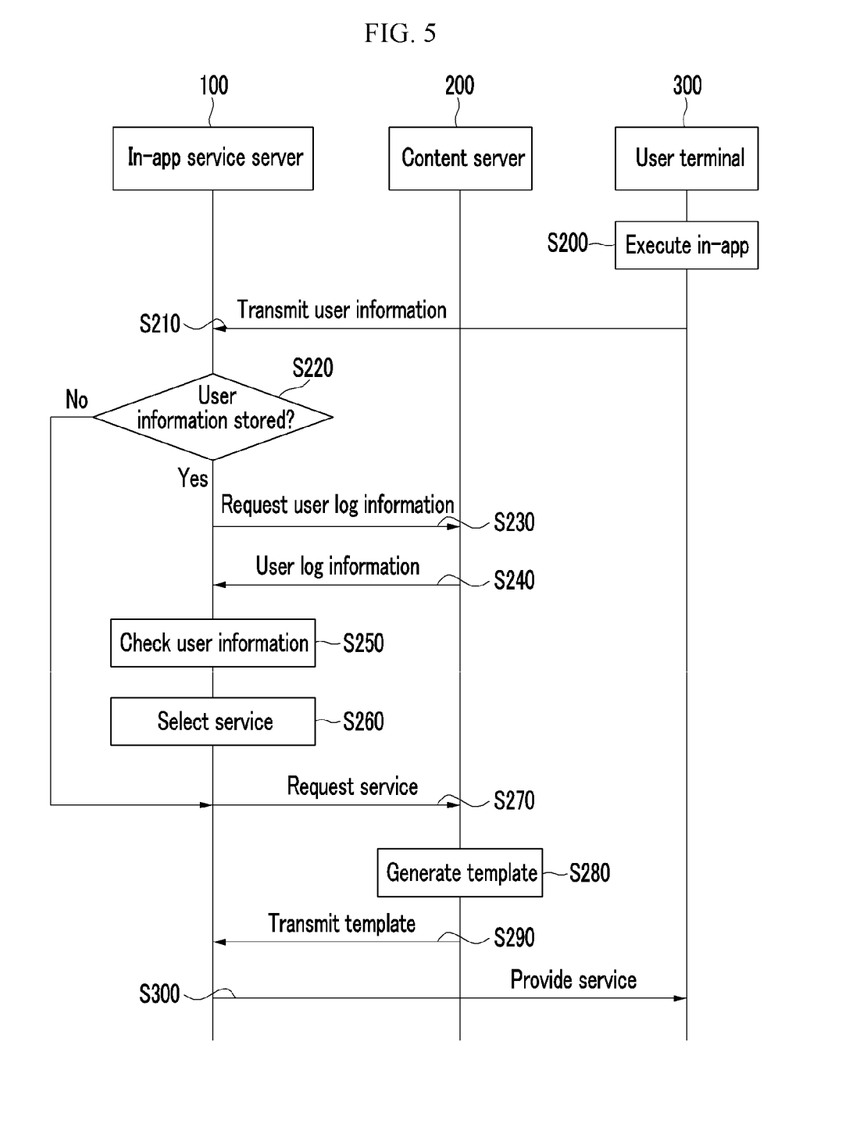
FIG. 5 is a flow chart illustrating the process of a method for providing a customized service according to an embodiment of the present invention.

FIG. 4 is a flow chart illustrating the process of a method for providing a source code according to an embodiment of the present invention, and FIG. 5 is a flow chart illustrating the process of a method for providing a customized service according to an embodiment of the present invention.

As shown in FIG. 4, when the developer registers a category of content to be provided through the developer terminal 100, information regarding a terminal to which an in-app is to be registered, UI information such as a layout or color of a template, and the like, to the category registering unit 211-1, the terminal information registering unit 211-2, and the UI information storage unit 211-3 of the in-app server 200 (S100), the category analyzing unit 212-1 and the terminal information analyzing unit 212-2 of the in-app server 200 analyze the category and the terminal information based on the registered information, respectively (S110).

The source code generation unit 212-3 requests a template URL/URI from the template URL/URI storage unit 230 based on the analyzed category information, and when a template URL/URI with respect to the category information is received, the source code generation unit 212-3 inserts it to generate a source code (S120). Here, the UI information received in step S100 is also inserted together into the source code.

When the source code is generated by the source code generation unit 212-3, the corresponding source code is transferred to the developer terminal 100 (S140), and the developer terminal 100 transfers the content to the content server 200 so as to be registered (S150). Then, the content storage unit 321 and the service URL/URI storage unit 322 of the content server 300 store the content and the content URL/URI received from the developer terminal 100, respectively (S160).

When the source code is provided to the developer terminal 100 and the content is stored in the content server 300 through the foregoing procedure, a service requested by the user terminal 400 is provided as a user-customized service. This will be described with reference to FIG. 5.

As shown in FIG. 5, when the user executes in-app by using the user terminal 400 (S200), user information is transferred from the user terminal 400 to the user information reception unit 221-1 of the in-app service server 200 (S210). Here, the user information refers to basic information regarding the user, such as identifier information of the user terminal 400, a user name, an in-app execution time, and the like.

Based on the identifier information, the user information reception unit 221-1 checks whether or not the identifier information among the information regarding the user has been previously stored in the user access information transmission unit 221-2 (S220). When the identifier information has been previously stored in the user access information transmission unit 221-2, the user log information reception unit 221-3 requests the user log information storage unit 330 of the content server 300 to provide user log information (S230). Here, the user log information includes information allowing for recognition of a user preference, such as information regarding a content category of a service commonly used by the user, information regarding a time during which the user commonly uses a service, and the like.

When the user log information storage unit 330 transfers user log information corresponding to the user information to the user log information reception unit 221-3 (S240), the service selection unit 222-1 checks the user information based on the information collected in steps S210 and S230 (S250). And then, the service selection unit 222-1 selects a service, i.e., content, to be provided to the user according to a user preference (S260).

When the service selection unit 222-1 requests the template generation unit 311 of the content server 300 to provide a service (S270), the template generation unit 311 generates a template including the corresponding content (S280). Here, the URL/URIs corresponding to the services stored in the service URL/URI storage unit 322 are transferred to the template generation unit 311 so that the template can be generated.

The template generation unit 311 transfers the integrated template including the URL/URI link corresponding to an in-app service to the content providing unit 222-2 of the in-app service server 200 (S290), and the content providing unit 222-2 provides the corresponding service to the user terminal 400 (S300).

An example of an in-app service provided to the user through this procedure will now be described with reference to FIG. 6.

Figure 6:
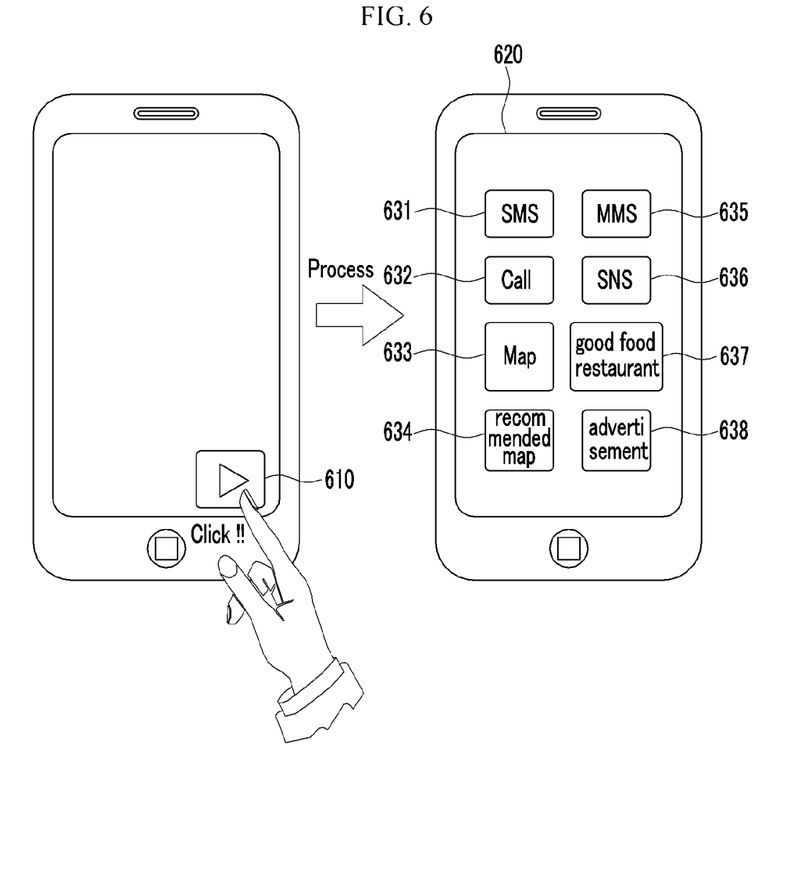
FIG. 6 is a view showing an in-app service according to an embodiment of the present invention.

FIG. 6 is a view showing an in-app service according to an embodiment of the present invention.

As shown in FIG. 6, when the user presses a component 610 for driving an in-app inserted in a Web app or a native app of the user terminal 400 to execute an in-app, a template 620 with respect to the in-app is executed. As shown, a user who frequently uses the in-app service or a user who first uses the in-app service can see or notice the template 620 including various contents 631 to 638 according to a user preference (in case of the user who frequently uses the in-app service) or according to a developer preference previously set by a developer (in case of the user who first uses the in-app service).

Namely, when an in-app in which a service commonly used by a user is recognized, included in the template 620, and then inserted as a component is executed and provided to the user, the in-app can be executed to use a desired service, without having to terminate an application in order to use a commonly used service while a service is being provided by driving a certain application. Thus, a customized service for each user can be provided.

In other words, various services included in the template 620 illustrated in FIG. 6 may include both Web-based services and app type services which have been downloaded to the user terminal 400. In such a case, all of the to Web-based services or the app type services have a content-specific URL/URI. Thus, when a service commonly used by the user is recognized as to what it is, a URL/URI with respect to content is inserted into the template 620 and provided to the user, so that the user can immediately use a desired service. Also, besides content, various advertisement services can be mounted to allow for doing businesses.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An in-app service providing system comprising:
an in-app service server, comprising one or more processors, that provides a customized service to a developer terminal or a user terminal by:
receiving, from the developer terminal or the user terminal, application information, wherein the application information comprises user information including information to identify the user terminal, a user name, a service access time, and a preferred service type from the user terminal;
sending, responsive to receiving the application information, a request for user log information;
receiving the requested user log information;
determining, based on the received user log information, a preferred service type based on the user log information being greater than or equal to a pre-set threshold value;
automatically generating a first source code based on the determined preferred service type;
transmitting a request for a template, wherein the request includes the generated first source code;
receiving, in response to the request for the template, the template, wherein the template comprises the first source code and URL/URI links that provide content corresponding to the preferred service type; and
transmitting the template to the developer terminal or the user terminal; and
a content server that provides the template to the in-app service server by:
receiving, from the in-app service server, the request for the user log information;
transmitting, to the in-app service server, the requested user log information;
receiving, from the in-app service server, the request for the template;
generating the template by adding URL/URI links corresponding to the preferred service type to the first source code; and
transmitting, to the in-app service server, the generated template.

2. The in-app service providing system of claim 1, wherein the in-app service server comprises:
a developer providing unit configured to communicate with the developer terminal to receive content to be included in a first template, generate a source code for the first template, and provide the source code for the first template to the developer terminal;
a user providing unit configured to communicate with the user terminal to provide a second template to the user terminal; and
a template URL/URI storage unit configured to communicate with the developer providing unit and the user providing unit, generate a source code including a URL/URI with respect to selected content based on category information input from a developer terminal and terminal information and provide the source code, including the URL/URI with respect to selected content based on the category information, to the developer providing unit, when the source code with respect to the first template is requested by the developer providing unit, and generate a source code including a URL/URI with respect to selected content based on the user information and the user log information and transfer the source code, including the URL/URI with respect to selected content based on the user information and the user log information, to the user providing unit, when source code with respect to the second template is requested by the user providing unit.

3. The in-app service providing system of claim 2, wherein the developer providing unit comprises:
a category registering unit configured to register category information regarding content input from the developer terminal;
a terminal information registering unit configured to store terminal information regarding a terminal in which an application input from the developer terminal is to be mounted; and
a user interface information storage unit configured to store user interface information of the first template provided according to driving of the application input from the developer terminal.

4. The in-app service providing system of claim 3, wherein the developer providing unit comprises:
a category analyzing unit configured to analyze the category information registered to the category registering unit, and set representative content to be provided to the user based on the analyzed category information;
a terminal information analyzing unit configured to analyze terminal information stored in the terminal information registering unit, and output the analyzed terminal information together with the category information analyzed by the category analyzing unit; and
a source code generation unit configured to receive the terminal information and the category information output from the terminal information analyzing unit, generate a first source code with respect to the first template, and transfer the first source code and the category information to the template URL/URI storage unit so as to transfer a second source code including URL/URI information corresponding to the category information to the developer terminal.

5. The in-app service providing system of claim 2, wherein the user providing unit comprises:
a user information reception unit configured to receive the user information;
a user access information transmission unit configured to transfer the user information received by the user information reception unit to the content server such that the user information is stored as the user log information with respect to the user terminal, and store received identification information of the user terminal; and
a user log information reception unit configured to receive the user log information with respect to the user terminal from the content server.

6. The in-app service providing system of claim 5, wherein the user providing unit comprises:
a service selection unit configured to select a content type to be provided to the user based on whether or not the user log information is received from the content server, and request the second template including a URL/URI with respect to the selected content from the template URL/URI storage unit; and
a content providing unit configured to receive the second template including the URL/URI with respect to the selected content from the template URL/URI storage unit and provide the received second template to the user terminal.

7. The in-app service providing system of claim 6, wherein, when the user log information is received from the content server, the service selection unit selects content to be provided to the user based on the user log information, and when the user log information is not received, the service selection unit selects pre-set content as content to be provided to the user.

8. The in-app service providing system of claim 1, wherein the content server comprises:
a template generation unit configured to generate the template based on user interface information, terminal information and category information stored in the in-app service server or generate the template based on the user log information when the user log information is collected, and add content in an input template based on a URL/URI link of the template;
a template storage unit configured to store the template generated by the template generation unit; and
a template URL/URI storage unit configured to receive URL/URI information of a template accessed by the user terminal from the in-app service server and store the received URL/URI information, and output a URL/URI link of the accessed template for providing content previously generated according to the stored URL/URI information to the user terminal.

9. The in-app service providing system of claim 8, wherein the content server comprises:
a content registering unit configured to register content input from the developer terminal;
a content storage unit configured to store content information regarding the content registered by the content registering unit; and
a service URL/URI storage unit configured to store a URL/URI corresponding to the content information stored by the content storage unit, provide the URL/URI to the template generation unit, receive the URL/URI link of the template stored in the URL/URI storage unit, and transfer the received URL/URI link to the template generation unit.

10. The in-app service providing system of claim 9, wherein the content server further comprises:
a user log information storage unit configured to receive the user log information from the in-app service server and store the received user log information, determine whether or not the stored user log information is equal to or greater than the pre-set threshold value when a request for providing the user log information is generated, and transfer the user log information to the in-app service server when the user log information is equal to or greater than the threshold value.

11. The in-app service providing system of claim 1, wherein the service access time comprises a time at which the user accesses the service.

12. A method for providing a customized service to a user by an in-app service providing system comprised of an in-app service server and a content server, the method comprising:
receiving, at the in-app service server from a developer terminal or a user terminal, application information, wherein the application information comprises user information including information to identify the user terminal, a user name, a service access time, and a preferred service type from the user terminal;
sending, by the in-app service server and responsive to receiving the application information, a request for user log information;
receiving, by the in-app service server, the requested user log information;
determining, by the in-app service server based on the received user log information, a preferred service type based on the user log information being greater than or equal to a pre-set threshold value;
automatically generating, by the in-app service server, a first source code based on the determined preferred service type;
transmitting, by the in-app service server, a request for a template, wherein the request includes the generated first source code;
receiving, by a content server and from the in-app service server, the request for the user log information;
transmitting, by the content server and to the in-app service server, the requested user log information;
receiving, by the content server and from the in-app service server, the request for the template;
generating, by the content server, the template by adding URL/URI links corresponding to the preferred service type to the first source code;
transmitting, by the content server, to the in-app service server, the generated template;
receiving, by the in-app service server and in response to the request for the template, the template, wherein the template comprises the first source code and URL/URI links that provide content corresponding to the preferred service type; and
transmitting, by the in-app service server, the template to the developer terminal or the user terminal.

13. The method of claim 12, further comprising:
checking whether or not the received application information has been previously stored;
after the checking and when the user information has not been stored, transferring pre-set content information to the content server;
generating, by the content server, the template such that the template includes content according to the pre-set content information, and transferring the generated template to the in-app service server; and
providing, by the in-app service server, the template to the user terminal.

14. The method of claim 12, further comprising:
before receiving the user information,
receiving, by the in-app service server, category information regarding a service to be provided to the user, information regarding a terminal in which an application is to be mounted, and user interface information of the template from a developer terminal;
generating the first source code based on the information received by the in-app service server; and
generating the second source code by adding a pre-set content URL/URI in the first source code, and transmitting the generated second source code to the developer terminal.

15. The method of claim 14, wherein the first source code includes only the user interface information, and the second source code includes both the user interface information and the content URL/URI information.

* * * * *